United States Patent
Barnes et al.

(10) Patent No.: US 10,068,261 B1
(45) Date of Patent: Sep. 4, 2018

(54) IN-FLIGHT CAMPAIGN OPTIMIZATION

(75) Inventors: James D. Barnes, Overland Park, KS (US); Sanjay K. Sharma, Olathe, KS (US); Peter H. Distler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1004 days.

(21) Appl. No.: 11/558,021

(22) Filed: Nov. 9, 2006

(51) Int. Cl.
  G06Q 30/00 (2012.01)
  G06Q 30/02 (2012.01)

(52) U.S. Cl.
  CPC .................. G06Q 30/0277 (2013.01)

(58) Field of Classification Search
  USPC ......................................................... 705/14
  See application file for complete search history.

(56) References Cited

U.S. PATENT DOCUMENTS

| | | |
|---|---|---|
| 5,636,346 A | 6/1997 | Saxe |
| 5,761,648 A | 6/1998 | Golden et al. |
| 5,848,396 A | 12/1998 | Gerace |
| 5,848,397 A | 12/1998 | Marsh et al. |
| 5,918,014 A | 6/1999 | Robinson |
| 5,918,041 A | 6/1999 | Berstis |
| 5,933,811 A | 8/1999 | Angles et al. |
| 5,937,392 A | 8/1999 | Alberts |
| 5,974,398 A | 10/1999 | Hanson et al. |
| 6,202,023 B1 | 3/2001 | Hancock et al. |
| 6,233,566 B1 | 5/2001 | Levine et al. |
| 6,266,649 B1 | 7/2001 | Linden et al. |
| 6,286,005 B1* | 9/2001 | Cannon .................. 707/100 |
| 6,317,722 B1 | 11/2001 | Jacobi et al. |
| 6,321,983 B1 | 11/2001 | Katayanagi et al. |
| 6,332,127 B1 | 12/2001 | Bandera et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |

(Continued)

FOREIGN PATENT DOCUMENTS

| | | |
|---|---|---|
| WO | WO03044703 A1 | 5/2003 |
| WO | WO2012093396 A1 | 7/2012 |
| WO | WO2015038562 A1 | 3/2015 |

OTHER PUBLICATIONS

Office Action dated Mar. 5, 2010, U.S. Appl. No. 11/474,880, filed Jun. 26, 2006, 24 pages.

(Continued)

*Primary Examiner* — Alvin L Brown

(57) ABSTRACT

Generally, an illustrative system for optimizing an advertising campaign on a mobile device includes a graphic user interface for accessing by at least one of a carrier and an advertiser, a data store, a campaign delivery engine for delivering advertisements into content provider spots and recording events into the data store, and an optimization engine. The optimization engine can support the graphic user interface and analyze one or more campaign events each linked with corresponding subscriber demographic data obtained from the data store for adjusting the advertising campaign during its run. The illustrative system can also support one or more methods disclosed herein.

20 Claims, 6 Drawing Sheets

(56) References Cited

U.S. PATENT DOCUMENTS

| | | |
|---|---|---|
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,328,169 B2 | 2/2008 | Temares et al. |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,698,335 B1 | 4/2010 | Vronay |
| 7,788,644 B2 | 8/2010 | Koduru et al. |
| 7,801,518 B1 | 9/2010 | Urbanek |
| 7,801,843 B2 | 9/2010 | Kumar et al. |
| 7,840,498 B2 | 11/2010 | Frank et al. |
| 7,958,005 B2 | 6/2011 | Dangaltchev |
| 7,974,616 B1 | 7/2011 | Urbanek |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 8,509,821 B1 | 8/2013 | Zang et al. |
| 8,650,184 B2 | 2/2014 | Kowalchuk et al. |
| 9,275,390 B1 | 3/2016 | Barnes et al. |
| 9,319,379 B1 | 4/2016 | Burcham et al. |
| 9,374,335 B2 | 6/2016 | Burcham et al. |
| 9,508,090 B1 | 11/2016 | Belser et al. |
| 9,590,938 B1 | 3/2017 | Burcham et al. |
| 9,734,515 B1 | 8/2017 | Belser et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0023482 A1 | 1/2003 | Messner et al. |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1* | 9/2004 | Hoffschulz et al. ......... 717/100 |
| 2005/0021403 A1* | 1/2005 | Ozer et al. .................. 705/14 |
| 2005/0028188 A1* | 2/2005 | Latona et al. ............... 725/13 |
| 2005/0078660 A1 | 4/2005 | Wood |
| 2005/0080772 A1 | 4/2005 | Bern |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0177449 A1* | 8/2005 | Temares ............... G06Q 30/02 705/7.33 |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0254712 A1 | 11/2005 | Lindeman |
| 2005/0256759 A1 | 11/2005 | Acharya et al. |
| 2005/0278296 A1 | 12/2005 | Bostwick |
| 2006/0026060 A1* | 2/2006 | Collins ............... G06Q 30/02 705/14.41 |
| 2006/0056433 A1 | 3/2006 | Herrmann |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0173556 A1 | 8/2006 | Rosenberg |
| 2006/0178932 A1 | 8/2006 | Lang |
| 2006/0178939 A1 | 8/2006 | Lang |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2006/0282316 A1 | 12/2006 | Snyder et al. |
| 2007/0005647 A1 | 1/2007 | Cugi et al. |
| 2007/0022009 A1* | 1/2007 | Cataldi et al. .................. 705/14 |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1* | 4/2007 | Ramer et al. ................... 705/1 |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2008/0004884 A1 | 1/2008 | Flake et al. |
| 2008/0010137 A1 | 1/2008 | Ho et al. |
| 2008/0040175 A1 | 2/2008 | Dellovo |
| 2008/0045245 A1 | 2/2008 | Billmaier et al. |
| 2008/0065476 A1 | 3/2008 | Klein et al. |
| 2008/0082412 A1 | 4/2008 | Tallyn et al. |
| 2008/0090599 A1 | 4/2008 | Patel et al. |
| 2008/0097851 A1 | 4/2008 | Bemmel et al. |
| 2008/0098420 A1 | 4/2008 | Khivesara et al. |
| 2008/0104637 A1 | 5/2008 | Rodriguez et al. |
| 2008/0120565 A1 | 5/2008 | Stiso et al. |
| 2008/0126515 A1* | 5/2008 | Chambers et al. ........... 709/218 |
| 2008/0140476 A1 | 6/2008 | Anand et al. |
| 2008/0147478 A1 | 6/2008 | Mall et al. |
| 2008/0228583 A1 | 9/2008 | MacDonald et al. |
| 2009/0013051 A1 | 1/2009 | Renschler et al. |
| 2009/0029721 A1 | 1/2009 | Doraswamy |
| 2009/0048977 A1 | 2/2009 | Aggarwal et al. |
| 2009/0070129 A1* | 3/2009 | Inbar ............... G06Q 30/018 705/317 |
| 2009/0076899 A1 | 3/2009 | Gbodimowo |
| 2009/0144139 A1 | 6/2009 | Gaedcke |
| 2009/0150215 A1 | 6/2009 | Kalb et al. |
| 2009/0157512 A1 | 6/2009 | King |

(56) References Cited

U.S. PATENT DOCUMENTS

| | | | |
|---|---|---|---|
| 2009/0198580 A1 | 8/2009 | Broberg et al. | |
| 2009/0216683 A1 | 8/2009 | Gutierrez | |
| 2009/0222329 A1 | 9/2009 | Ramer et al. | |
| 2009/0256858 A1 | 10/2009 | Ogikubo et al. | |
| 2009/0265245 A1* | 10/2009 | Wright | 705/14.66 |
| 2009/0271255 A1 | 10/2009 | Utter et al. | |
| 2009/0292608 A1 | 11/2009 | Polachek | |
| 2010/0082422 A1 | 4/2010 | Heilig et al. | |
| 2010/0082429 A1 | 4/2010 | Samdadiya et al. | |
| 2010/0119111 A1 | 5/2010 | Helfman et al. | |
| 2010/0222035 A1 | 9/2010 | Robertson et al. | |
| 2010/0228592 A1 | 9/2010 | Anderson et al. | |
| 2011/0022447 A1 | 1/2011 | Pelaic | |
| 2011/0082939 A1 | 4/2011 | Montemurro et al. | |
| 2011/0106622 A1 | 5/2011 | Kuhlman et al. | |
| 2011/0131109 A1 | 6/2011 | Pappas et al. | |
| 2011/0246890 A1 | 10/2011 | Mellamphy et al. | |
| 2011/0258049 A1 | 10/2011 | Ramer et al. | |
| 2011/0270687 A1 | 11/2011 | Bazaz | |
| 2011/0288913 A1 | 11/2011 | Waylonis et al. | |
| 2011/0321167 A1 | 12/2011 | Wu et al. | |
| 2012/0072271 A1 | 3/2012 | Dessert et al. | |
| 2012/0123830 A1 | 5/2012 | Svendsen et al. | |
| 2012/0123862 A1 | 5/2012 | Kurra et al. | |
| 2012/0170521 A1 | 7/2012 | Vogedes et al. | |
| 2012/0179536 A1 | 7/2012 | Kalb et al. | |
| 2012/0215911 A1 | 8/2012 | Raleigh et al. | |
| 2013/0006743 A1 | 1/2013 | Moore et al. | |
| 2013/0018714 A1 | 1/2013 | George | |
| 2013/0060631 A1 | 3/2013 | Corson et al. | |
| 2013/0115872 A1 | 5/2013 | Huang et al. | |
| 2013/0138506 A1 | 5/2013 | Zhu et al. | |
| 2013/0211925 A1 | 8/2013 | Holland | |
| 2013/0211941 A1 | 8/2013 | Hallowell et al. | |
| 2013/0304586 A1* | 11/2013 | Angles et al. | 705/14.66 |
| 2013/0311293 A1 | 11/2013 | Ward et al. | |
| 2013/0331027 A1 | 12/2013 | Rose et al. | |
| 2014/0006129 A1 | 1/2014 | Heath | |
| 2014/0052536 A1 | 2/2014 | McAndrew et al. | |
| 2014/0059141 A1 | 2/2014 | Belkin et al. | |
| 2014/0066029 A1 | 3/2014 | Brennan et al. | |
| 2014/0080467 A1 | 3/2014 | Urbanek | |
| 2014/0089113 A1 | 3/2014 | Desai et al. | |
| 2014/0136314 A1 | 5/2014 | Kiet et al. | |
| 2014/0222569 A1 | 8/2014 | Kerr | |
| 2014/0235265 A1 | 8/2014 | Slupik | |
| 2014/0274031 A1 | 9/2014 | Menendez | |
| 2014/0278953 A1 | 9/2014 | Ismail et al. | |
| 2014/0379448 A1 | 12/2014 | Gregory | |
| 2014/0379467 A1 | 12/2014 | Huang et al. | |
| 2015/0074204 A1 | 3/2015 | Burcham et al. | |
| 2015/0121418 A1 | 4/2015 | Jain et al. | |
| 2015/0208199 A1 | 7/2015 | Li et al. | |
| 2015/0249914 A1 | 9/2015 | Yu et al. | |

OTHER PUBLICATIONS

Lightningcast, Inc., "Lightningcast Mobile Video Advertising Solution," May 2, 2005, 14 pgs.

Patent Application entitled, "Dynamic Advertising Content Distribution and Placement Systems and Methods," by James D. Barnes, et al., filed Apr. 17, 2006 as U.S. Appl. No. 11/405,195.

Patent Application entitled, "Mobile-Device-Based Coupon Management Systems and Methods," by James D. Barnes, et al., filed Apr. 13, 2006 as U.S. Appl. No. 11/403,614.

Patent Application entitled, "Systems and Methods for State-Based Advertisement Messaging Across Media Types," by James D. Barnes, et al., filed May 22, 2006 as U.S. Appl. No. 11/438,540.

Patent Application entitled, "Subscriber Data Insertion Into Advertisements Requests," by James D. Barnes, et al., filed Jul. 21, 2006 as U.S. Appl. No. 11/491,387.

Patent Application entitled, "Communication Device Usage Event Profiling," by Robert E. Urbanek, filed Jun. 8, 2006 as U.S. Appl. No. 11/449,078.

Patent application entitled "Seamless Retrieval of Non-Standard Items for a Mobile Device," filed May 12, 2006, as U.S. Appl. No. 11/433,301.

Patent Application entitled, "Inventory Management Integrating Subscriber and Targeting Data," by James D. Barnes, et al., filed Jun. 26, 2006 as U.S. Appl. No. 11/474,880.

Patent Application entitled, "Behavioral Analysis Engine for Profiling Wireless Subscribers," by James D. Barnes, et al., filed Nov. 8, 2006 as U.S. Appl. No. 11/557,939.

Patent Application entitled, "Carrier Data Bassed Product Inventory Management and Marketing," by James D. Barnes, et al., filed Dec. 28, 2006 as U.S. Appl. No. 11/617,703.

Patent Application entitled, "Advertisement Inventory Management," by James D. Barnes, et al., filed Oct. 27, 2008 as U.S. Appl. No. 12/259,187.

Patent Application entitled, "Method and System for Providing Custom Background-Downloads," by Geoff S. Martin, et al., filed Nov. 16, 2007 as U.S. Appl. No. 11/280,576.

Patent Application entitled, "Method and System Using Location History for Targeted Coupon Distribution," by Von K. McConnell, et al., filed May 17, 2000 as U.S. Appl. No. 09/572,282.

Patent application entitled "Method and System for Facilitating Determination of Call-Drop Locations in a Wireless Network," filed Sep. 9, 2003, as U.S. Appl. No. 10/658,353.

Office Action dated Jun. 17, 2008, U.S. Appl. No. 11/405,195, filed Apr. 17 2006, 7 pages.

Office Action dated Aug. 15, 2008, U.S. Appl. No. 11/405,195, filed Apr. 17 2006, 12 pages.

Final Office Action dated Feb. 26, 2009, U.S. Appl. No. 11/405,195, 17 pages.

Advisory Action dated May 7, 2009, U.S. Appl. No. 11/405,195, 2 pages.

Office Action dated Aug. 18, 2009, U.S. Appl. No. 11/405,195, 17 pages.

Office Action dated Feb. 27, 2009, U.S. Appl. No. 11/433,301, filed May 12, 2006, 13 pages.

Notice of Allowance dated Oct. 26, 2009, U.S. Appl. No. 11/433,301, filed May 12, 2006, 7 pages.

Office Action dated Jun. 17, 2008, U.S. Appl. No. 11/403,614, filed Apr. 13, 2006, 7 pages.

Office Action dated Aug. 27, 2008, U.S. Appl. No. 11/403,614, filed Apr. 13, 2006, 11 pages.

Final Office Action dated Mar. 4, 2009, U.S. Appl. No. 11/403,614, filed Apr. 13, 2006, 12 pages.

Advisory Action dated May 7, 2009, U.S. Appl. No. 11/403,614, filed Apr. 13, 2006, 3 pages.

Office Action dated Aug. 20, 2009, U.S. Appl. No. 11/403,614, filed Apr. 13, 2006, 11 pages.

Office Action dated Nov. 3, 2008, U.S. Appl. No. 11/438,540, filed May 22, 2006, 14 pages.

Office Action dated Apr. 28, 2009, U.S. Appl. No. 11/438,540, filed May 22, 2006, 16 pages.

Office Action dated Jul. 10, 2009, U.S. Appl. No. 11/438,540, filed May 22, 2006, 3 pages.

Office Action dated Oct. 16, 2009, U.S. Appl. No. 11/438,540, filed May 22, 2006, 12 pages.

Office Action dated Feb. 4, 2009, U.S. Appl. No. 11/491,387, filed Jul. 21, 2006, 9 pages.

Final Office Action dated Aug. 6, 2009, U.S. Appl. No. 11/491,387, filed Jul. 21, 2006, 13 pages.

Advisory Action dated Oct. 19, 2009, U.S. Appl. No. 11/491,387, filed Jul. 21, 2006, 4 pages.

Office Action dated Nov. 14, 2008, U.S. Appl. No. 11/474,880, filed Jun. 26, 2006, 17 pages.

Final Office Action dated May 28, 2009, U.S. Appl. No. 11/474,880, filed Jun. 26, 2006, 23 pages.

Advisory Action dated Oct. 19, 2009, U.S. Appl. No. 11/474,880, filed Jun. 26, 2006, 4 pages.

Advisory Action (corrected) dated Oct. 27, 2009, U.S. Appl. No. 11/474,880, filed Jun. 26, 2006, 4 pages.

Final Office Action dated Apr. 20, 2010, U.S. Appl. No. 11/438,540, filed May 22, 2006, 26 pages.

(56) References Cited

OTHER PUBLICATIONS

Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Mechandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cyle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Advisory Action dated Jun. 7, 2011, U.S. Appl. No. 11/617,703, filed Dec. 28, 2006.
Examiner's Answer dated Nov. 2, 2016, U.S. Appl. No. 11/474,880, filed Jun. 26, 2006.
FAIPP Pre-Interview Communication dated Sep. 9, 2016, U.S. Appl. No. 14/024,627, filed Sep. 11, 2013.
Notice of Allowance dated Oct. 24, 2016, U.S. Appl. No. 14/024,627, filed Sep. 11, 2013.
Final Office Action dated Oct. 14, 2016, U.S. Appl. No. 14/150,832, filed Jan. 9, 2014.
Barnes, James D., et al., entitled, "Behavioral Analysis Engine for Profiling Wireless Subscribers," filed Aug. 3, 2016, U.S. Appl. No. 15/227,950.
Decision on Appeal dated Apr. 14, 2017, U.S. Appl. No. 12/259,187, filed Oct. 27, 2008.
Notice of Allowance dated Apr. 3, 2017, U.S. Appl. No. 14/150,832, filed Jan. 9, 2014.
FAIPP Pre-Interview Communication dated May 9, 2017, U.S. Appl. No. 14/532,969, filed Nov. 4, 2014.
Office Action dated Aug. 5, 2014, U.S. Appl. No. 11/557,939, filed Nov. 8, 2006.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Advisory Action dated Oct. 29, 2015, U.S. Appl. No. 11/474,880, filed Jun. 26, 2006.
Supplemental Advisory Action dated Nov. 2, 2015, U.S. Appl. No. 11/474,880, filed Jun. 26, 2006.
Advisory Action dated May 18, 2015, U.S. Appl. No. 11/557,939, filed Nov. 8, 2006.
Office Action dated Dec. 17, 2015, U.S. Appl. No. 11/557,939, filed Nov. 8, 2006.
FAIPP Pre-Interview Communication dated Nov. 18, 2015, U.S. Appl. No. 14/024,629, filed Sep. 11, 2013.
Notice of Allowance dated Dec. 16, 2015, U.S. Appl. No. 13/956,367, filed Aug. 1, 2013.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
First Action Interview Office Action dated Dec. 17, 2015, U.S. Appl. No. 14/494,601, filed Sep. 24, 2014.
Notice of Allowance dated Jan. 28, 2016, U.S. Appl. No. 14/024,629, filed Sep. 11, 2013.
FAIPP Pre-Interview Communication dated Apr. 15, 2016, U.S. Appl. No. 13/911,074, filed Jun. 5, 2013.
FAIPP Pre-Interview Communication dated Feb. 16, 2016, U.S. Appl. No. 14/245,822, filed Apr. 4, 2014.
Foreign Communication from a Related Counterpart—Preliminary Report on Patentability dated Mar. 24, 2016, PCT/US14/54877, filed on Sep. 10, 2014.
Hannebaum, Ryan K., et al., entitled, "Advertisement Campaign Target Selection Engine," filed Apr. 4, 2014, U.S. Appl. No. 14/245,822.
Final Office Action dated May 3, 2016, U.S. Appl. No. 11/557,939, filed Nov. 8, 2006.
Restriction Requirement dated May 19, 2016, U.S. Appl. No. 14/024,627, filed Sep. 11, 2013.
Office Action dated May 17, 2016, U.S. Appl. No. 14/150,832, filed Jan. 9, 2014.
First Action Interview Office Action dated Apr. 28, 2016, U.S. Appl. No. 14/245,822, filed Apr. 4, 2014.
Office Action dated Jul. 1, 2016, U.S. Appl. No. 14/165,569, filed Jan. 27, 2014.
Office Action dated Jul. 14, 2016, U.S. Appl. No. 14/165,571, filed Jan. 27, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Burcham, Robert H., et al., entitled "Swipe Screen Advertisement Metrics and Tracking," filed Nov. 27, 2013, U.S. Appl. No. 61/910,001.
Burcham, Robert H., et al., entitled "Swipe Screen Advertisement Metrics and Tracking," filed Jan. 27, 2014, U.S. Appl. No. 14/165,569.
Delker, Jason R., et al., entitled "Ad Management Using Ads Cached on a Mobile Electronic Device," filed Nov. 27, 2013, U.S. Appl. No. 61/910,002.
Delker, Jason R., et al., entitled "Ad Management Using Ads Cached on a Mobile Electronic Device," filed Jan. 27, 2014, U.S. Appl. No. 14/165,571.
Advisory Action dated Dec. 27, 2016, U.S. Appl. No. 14/150,832, filed Jan. 9, 2014.
Notice of Allowance dated Jul. 16, 2015, U.S. Appl. No. 11/438,540, filed May 22, 2006.
Final Office Action dated Aug. 31, 2015, U.S. Appl. No. 11/474,880, filed Jun. 26, 2006.
FAIPP Pre-Interview Communication dated Sep. 23, 2015, U.S. Appl. No. 13/956,367, filed Aug. 1, 2013.
FAIPP Office Action dated Jul. 2, 2015, U.S. Appl. No. 14/150,832, filed Jan. 9, 2014.
FAIPP Pre-Interview Communication dated Sep. 18, 2015, U.S. Appl. No. 14/494,601, filed Sep. 24, 2014.
Wikipedia, "Foursuare," https://en.wikipedia.org/w/index.php?title=Foursquare&oldid=681836736, Mar. 2009, last accessed on Sep. 25, 2015.
Belser, John E., et al., entitled "End User Participation in Mobile Advertisement," filed Sep. 24, 2014, U.S. Appl. No. 14/494,601.
Decision on Appeal dated Apr. 28, 2015, U.S. Appl. No. 11/438,540, filed May 22, 2006.
Office Action dated Feb. 25, 2015, U.S. Appl. No. 11/474,880, filed Jun. 26, 2006.
Final Office Action dated Mar. 2, 2015, U.S. Appl. No. 11/557,939, filed Nov. 8, 2006.
Examiner's Answer dated Mar. 12, 2015, U.S. Appl. No. 12/259,187, filed Oct. 27, 2008.
FAIPP Pre-Interview Communication dated Apr. 3, 2015, U.S. Appl. No. 14/150,832, filed Jan. 9, 2014.
Thierer, et al., "Privacy Solutions (Part 2): Adblock Plus," Technology Liberation Front, Sep. 8, 2008, on line at techliberation.com.
Burcham, Robert H., et al., entitled "IP Address Hashing in Advertisement Gateway," filed Jan. 21, 2014, U.S. Appl. No. 14/160,196.
Burcham, Robert H., et al., entitled "Client Mediation and Integration to Advertisement Gateway," filed Jan. 21, 2014, U.S. Appl. No. 14/160,206.
Burcham, Robert H., et al., entitled "Address Modification for Advertisement Mediation," filed Jan. 21, 2014, U.S. Appl. No. 14/160,215.
Burcham, Robert H., et al., entitled "Advertisement Mediation of Supply-Demand Communications," filed Jan. 21, 2014, U.S. Appl. No. 14/160,224.
Delker, Jason R., et al., entitled, "Enhanced Dialer for a Mobile Communication Device," filed Mar. 4, 2015, U.S. Appl. No. 14/639,057.

(56) References Cited

OTHER PUBLICATIONS

Ferrante, Piero D., et al., entitled, "System and Method for Subscriber Cluster Synthesis," filed Feb. 11, 2015, U.S. Appl. No. 14/619,689.
Decision on Appeal dated Nov. 18, 2014, U.S. Appl. No. 11/474,880, filed Jun. 26, 2006.
Sterling, Greg, "Google Replacing "Android ID" with"Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?," http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H., et al., entitled "System and Method to Generate an Abstract Advertisement Campaign Management and Implement Policy Enforcement," filed Sep. 11, 2013, U.S. Appl. No. 14/024,629.
Burcham, Robert H., et al., entitled "System and Method to Generate an Abstract Advertisement Campaign Management and Implement Policy Enforcement," filed Sep. 10, 2014, PCT Application Serial No. PCT/US2014/054877.
Burcham, Robert H., et al., entitled "Methods and Systems of Generating a Unique Mobile Device Identifier," filed Aug. 1, 2013, U.S. Appl. No. 13/956,367.
Holmes, Geoffrey A., entitled "Methods and Systems of Collecting and Segmenting Device Sensor Data for Mobile Device Identification," filed Jun. 5, 2013, U.S. Appl. No. 13/911,074.
Belser, John E., et al., entitled "Ad Management Using Ads Cached on a Mobile Electronic Device," filed Jan. 9, 2014, U.S. Appl. No. 14/150,832.
Katzer, Robin D., et al., entitled "Advertisement Dynamic Queue Management," filed Apr. 10, 2014, U.S. Appl. No. 14/250,381.
Burcham, Robert H., et al., entitled "Categorization of Unknown Variables in a Target Information Database," filed Nov. 4, 2014, U.S. Appl. No. 14/532,969.
Bell, Timothy L., et al., entitled "Method for Consumer Profile Consolidation Using Mobile Network Identification," filed Oct. 20, 2014, U.S. Appl. No. 14/518,504.
Arivukkarasu, Anand, et al., entitled "Telecom Services to Support Retail Fuel Stocking Logistics," filed Nov. 12, 2014, U.S. Appl. No. 14/539,715.
Office Action dated Jul. 10, 2017, U.S. Appl. No. 11/403,614, filed Apr. 13, 2006.
FAIPP Office Action dated Jul. 19, 2017, U.S. Appl. No. 14/532,969, filed Nov. 4, 2014.
FAIPP Pre-Interview Communication dated Oct. 4, 2017, U.S. Appl. No. 14/619,689, filed Feb. 11, 2015.
FAIPP Office Action dated Dec. 4, 2017, U.S. Appl. No. 14/619,689, filed Feb. 11, 2015.
Final Office Action dated Dec. 15, 2017, U.S. Appl. No. 14/532,969, filed Nov. 4, 2014.
Advisory Action dated Jan. 24, 2018, U.S. Appl. No. 14/532,969, filed Nov. 4, 2014.
Final Office Action dated Jul. 22, 2011, U.S. Appl. No. 11/405,195, filed Apr. 17, 2006.
Final Office Action dated Sep. 7, 2011, U.S. Appl. No. 11/474,880, filed Jun. 26, 2006.
Office Action dated Jul. 21, 2011, U.S. Appl. No. 12/259,187, filed Oct. 27, 2008.
Patent Application entitled "Seamless Retrieval of Non-Standard Items for a Mobile Device," by James D. Barnes, et al., filed Jan. 12, 2010, as U.S. Appl. No. 12/686,188.
Examiner's Answer dated Oct. 27, 2011, U.S. Appl. No. 11/438,540, filed May 22, 2006.
Advisory Action dated Nov. 15, 2011, U.S. Appl. No. 11/474,880, filed Jun. 26, 2006.
Final Office Action dated Dec. 12, 2011, U.S. Appl. No. 12/259,187, filed Oct. 27, 2008.

* cited by examiner

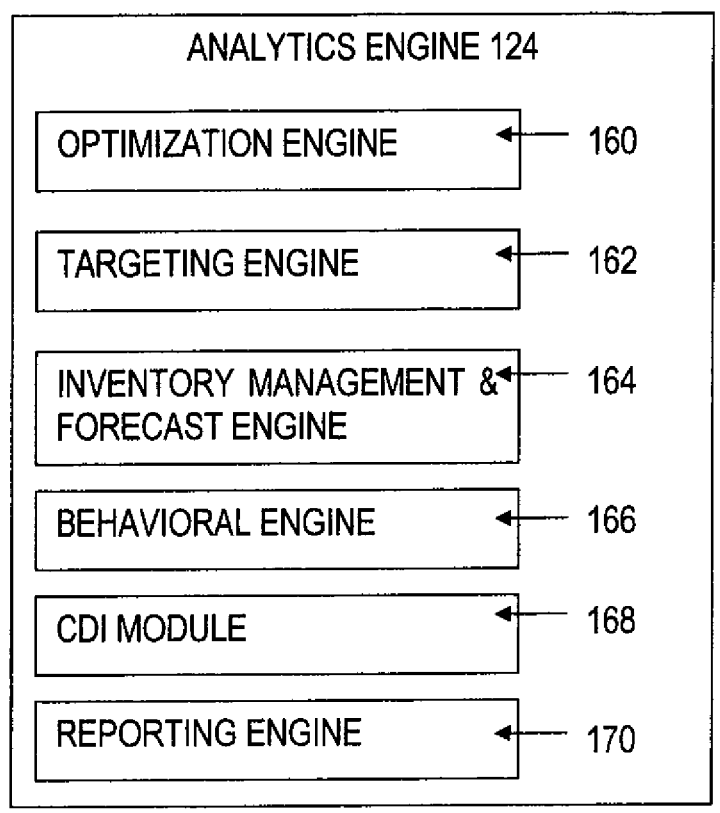
FIGURE
1B

IN-FLIGHT CAMPAIGN OPTIMIZATION

CROSS-REFERENCE TO RELATED APPLICATIONS

This application includes subject matter related to the following applications, each hereby incorporated by reference in its entirety:

U.S. patent application Ser. No. 11/438,540, filed May 22, 2006, entitled, "Systems and Methods for State-Based Advertisement Messaging Across Media Types," by James Barnes, et al.

U.S. patent application Ser. No. 11/405,195, filed Apr. 17, 2006, entitled, "Dynamic Advertising Content Distribution and Placement Systems and Methods," by James Barnes, et al.

BACKGROUND

Advertising and marketing executives are constantly focused on reaching customers in new and innovative ways. With the widespread use of wireless communication devices and continuous advances in handset technology, previously untapped new avenues of advertising are becoming readily available. Because of the breadth of varying technology in handsets, the many types of media, and the lack of infrastructure to support advertising in the wireless world (compared to, for example, the Internet or television advertising), tools in the form of both software and hardware are needed to most efficiently and effectively manage advertising content and campaigns in the new mobile avenues for advertising.

SUMMARY

An illustrative method of optimizing an advertising campaign presented on at least one mobile device can include presenting the advertising campaign on at least one mobile device of a subscriber, receiving results of the advertising campaign, associating each campaign event with subscriber data linked via a unique subscriber identifier, evaluating the advertising campaign based on a comparison of actual segments of subscribers receiving one or more campaign events versus a desired segment, and optimizing the advertising campaign during its run based on the results of the comparison. The desired result may include subscribers in a desired segment for the advertising campaign that generally includes one or more advertisements. The results may include each campaign event associated with a unique subscriber identifier. Optionally, the illustrative method can include determining a desired result before presenting the advertising campaign on the mobile device of the subscriber.

Generally, an illustrative system for optimizing an advertising campaign on a mobile device includes a graphic user interface for accessing by at least one of a carrier and an advertiser, a data store, a campaign delivery engine for delivering advertisements into content provider spots and recording events into the data store, and an optimization engine. The optimization engine can support the graphic user interface and analyze one or more campaign events each linked with corresponding subscriber demographic data obtained from the data store for adjusting the advertising campaign during its run.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

FIG. 1B is a block diagram of an illustrative analytics engine of the system of FIG. 1A.

DETAILED DESCRIPTION

Figure 1A:
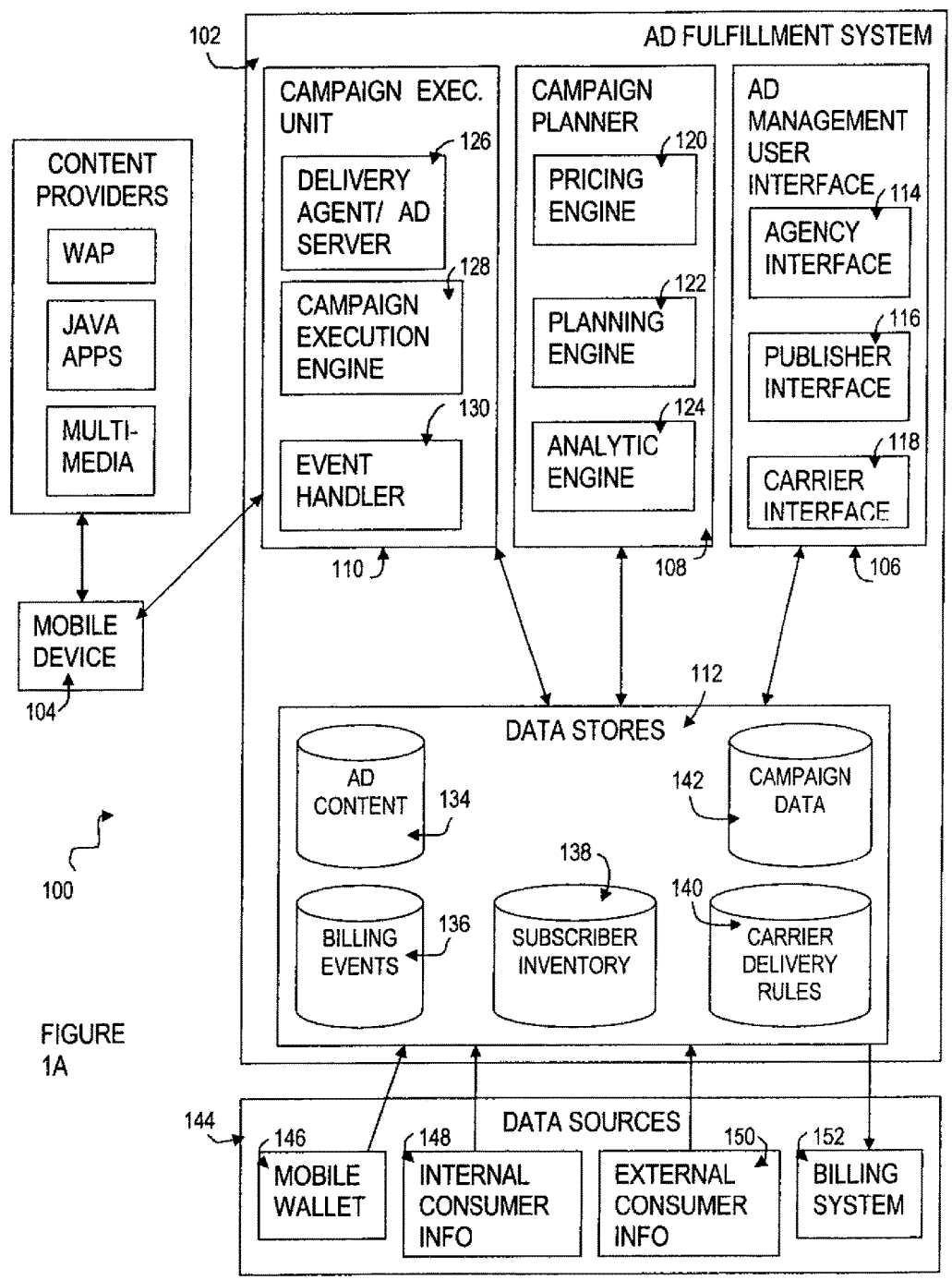
FIG. 1A is a block diagram of an illustrative high-level architecture for a system according to various embodiments of the present disclosure.

It should be understood at the outset that although an illustrative implementation of various embodiments is provided below, the present system may be implemented using any number of techniques, whether currently known or not yet in existence. The present disclosure should in no way be limited to the illustrative implementations, drawings, and techniques illustrated below.

I. Overview

With new avenues of advertising in the mobile device environment, the systems and methods of the present disclosure can provide an automated system for tying advertising event data with subscriber data to permit rapid evaluation of the number and type of subscribers viewing a particular advertising event, regardless of the publisher providing the spot for the advertisement. This speed permits the evaluation and optimization of an advertising campaign one, two or multiple times during the course of its run.

The following disclosure is divided into five sections including this overview. Section I includes defining terminology used in this disclosure. Section II describes an illustrative system architecture. Section III describes an illustrative analytic engine and relationships with other components. Section IV describes an illustrative in-flight campaign optimization system. Section V describes an illustrative mode of operation. Section VI describes an illustrative computer for supporting the systems and methods disclosed herein.

Terminology

As used herein, the term "carrier" refers to a telecommunications company that provides communication services for a mobile device under a subscriber agreement.

As used herein, the term "publisher" refers to the companies that provide the mechanism to display advertisements. For example, a publisher could be a WAP content provider, a Multi-media content provider, or a java application provider. Specifically, publishers are content providers.

As used herein, the term "pricing" refers to the process of rating advertisements to determine the price of running a given advertisement at a particular time, in a particular application, and the like.

As used herein, the term "impressions" refers to the number of instances that any given advertisement has been displayed, or is desired to be displayed by the mobile device.

As used herein, the term "spots" refers to an available instance in an application, splash screen or white space in which an advertisement may be displayed. A spot, in this context of advertising in a mobile device, is analogous to the use of the term "spot" to refer to an available instance for a commercial on television or radio between major programs. Just as "spots" may be sold for advertising on television during the a sporting event such as the Superbowl or during a popular program, spots may be sold for advertising in applications, white spaces, and splash screens in a mobile device. Desirably, a spot conveys both visual and audio information, but a spot can convey solely audio or video information.

As used herein, the term "targeting information" refers to input criteria that identify an individual or group of individual mobile device users that are to be targeted in an advertising campaign.

As used herein, the term "media type" refers to how, technologically, a given advertisement is displayed. For example, the media type may indicate whether a given advertisement is displayed via a WAP page, through a multi-media player, or embedded within a Java application.

As used herein, the term "category" refers to the types of products or services being advertised in a given advertisement (e.g., travel, groceries, sports & outdoors, name brand consumer goods, etc.).

As used herein, the term "inventory" refers to the overall quantity and identity of spots available for sale for display of advertising.

As used herein, the term "mobile wallet" refers to a payment platform technology that enables mobile device users to store their personal details and preferred payment options—including credit cards, debit cards and stored value accounts—in a virtual wallet in their mobile devices. Mobile device users then choose which payment method to use when making payments via their mobile phone for mobile Internet purchases, and retail payments at the point-of-sale in a manner similar to undertaking a transaction from a conventional wallet.

As used herein, the term "campaign event" or "event" refers to a single presentation of an advertisement for a campaign.

As used herein, the term "weighting" refers to the amount of playtime for an advertisement.

As used herein, the term "reach" refers to the number of unique subscribers who have been exposed to an event.

As used herein, the term "segment" refers to a subset of an advertising campaign audience. A segment can be defined by demographic, e.g., age or gender, or behavioral information, e.g., subscribers who view sports websites. As an example, a segment may be defined as, "males aged 25-35" and such a segment can be targeted in a campaign.

As used herein, the term "in-flight" refers to the ongoing nature of an activity, such as an advertising campaign. In such an instance, changes made during the campaign may be referred to as being made "in-flight" or "during its run", as opposed to an analysis conducted at the end of a campaign.

II. System Architecture

FIG. 1A is a block diagram of a high-level architecture for a system 100 for advertising management. The system 100 generally encompasses an advertisement or ad fulfillment system 102 of a carrier and a mobile device 104 associated with the carrier. The details of the mobile device 104 are not particularly relevant to the present disclosure and thus are not handled in great detail herein. Typically, a mobile device 104 will be associated with a particular carrier with whom the user has contracted as a subscriber for services.

The advertisement fulfillment system 102 comprises an advertisement management user interface 106, a campaign planner 108, a campaign execution unit 110, and data stores 112. The advertisement management user interface 106 interfaces with the various users, and includes an interface for each type of user, such as an agency interface 114 for one or more advertisement agencies, a publisher interface 116 for one or more publishers, and a carrier interface 118 for the carrier for the advertisement fulfillment system. Through the agency interface 114, advertisement agencies may create advertising campaigns, supply advertisements, view the inventory, and view reports, each of which will be discussed in greater detail herein. Through the publisher interface 116, publishers may add inventory, receive advertisement application program interfaces ("APIs") and view reports, each of which will be discussed in great detail herein. Similarly, through the carrier interface 118, the carrier may rate and price advertisements, generate delivery rules for advertisements, validate the advertisements, and view reports, each of which will be discussed in greater detail herein.

The campaign planner 108 comprises various engines, which may be implemented in hardware, software, or a combination of hardware and software. Specifically, the campaign planner 108 comprises a pricing engine 120, a planning engine 122, and an analytic engine 124. The campaign planner 108 is operably linked to the data stores 112 such that data in the various data stores 112 may be utilized by the pricing engine 120, the planning engine 122, and the analytic engine 124.

The pricing engine 120 facilitates the definition of pricing rules by the carrier. Within a given campaign, pricing may vary and be dependent on various factors. One factor that may affect pricing is the time the advertisement is served. Another factor that may affect pricing is the available inventory (based on supply and demand). Yet another factor that may affect pricing is the industry in which the advertisement will stimulate interest (for example, an automobile is worth more than a cup of coffee). Another factor that may affect pricing is which particular event causes an advertisement to be displayed (i.e., click-to-call when the user of the mobile device presses a button to make a call vs. click-to-URL when the user of the mobile device presses a button to connect to a particular website). Still another factor that may affect pricing is the channel by which the advertisement is broadcast (i.e., the media type—WAP and multimedia advertisements have different costs). Other factors that may affect pricing are the location of the device and whether targeting is used to determine which advertisement is displayed.

The planning engine 122 is the primary component of the campaign planner 108. The planning engine 122 interfaces between the other components to facilitate the campaign definition process. The planning engine 122 supports the various users as described above, namely the advertisement agency, publisher, and carrier. The functionality provided by the planning engine 122 for each of these users is discussed in turn below.

For the advertisement agency user, the planning engine 122 facilitates advertisement and campaign management by enabling the advertisement agency user to add, view, update, and delete advertisements. The planning engine 122 also provides campaign lifecycle management by enabling the advertisement agency user to define, view, update, delete, start, and stop campaigns. A campaign definition defined by the advertisement agency user with the planning engine 122 may, in various embodiments, include the following criteria: the campaign start date, the campaign end date, a number of impressions, a number of subscribers targeted by the campaign, advertisements, spots, a mapping of each advertisement to a spot, targeting criteria, and pricing. In various embodiments, the targeting criteria may include, for example, demographic data such as age, gender, marital status, income level, whether the user has children, and educational level. In various embodiments, the targeting criteria may include, for example, behavioral categories (i.e., sports, music, or travel preferences), or location of the subscriber (based on the subscriber zip code or a GPS location). In various embodiments, the targeting criteria may include, for example, search keywords. In various embodiments, the planning engine supports the dynamic addition and deletion of targeting criteria such as those described herein.

As will be discussed below with respect to components of the analytics engine 124 regarding campaign modeling and planning optimization, the advertisement agency user can input a subset of the campaign information (i.e., targeting criteria) listed above and components of the analytics engine 124 will generate the remainder of the criteria necessary to meet the criteria that was specified. In various embodiments, the advertisement agency user may vary any of the above targeting criteria, and as a result, the analytics engine 124 recommends values for the non-varied criteria.

For example, in a first scenario, the advertisement agency user inputs at least start and stop dates, advertisements, spots (i.e., times available for advertising to be displayed) and targeting information such as, for example, targeting an age group, i.e., a segment, of 18-35 year old males. Based on these provided inputs, the analytics engine 124 generates a number of impressions and a number of targeted subscribers. The analytics engine 124 references the inventory management and forecasting engine 164 (discussed in greater detail below) for fine-grain analysis of historical statistics.

For example, in a second scenario, the advertisement agency user inputs at least start and stop dates, advertisements, spots (i.e., times available for advertising to be displayed), a number of impressions (i.e., instances of display for each advertisements, such as no more than three times displayed) and a number of targeted subscribers. Based on these provided inputs, the analytics engine 124 generates the remaining necessary targeting criteria such as, for example, demographics and location, by referencing the historical statistics of the inventory management and forecasting engine 164.

For the publisher user, the planning engine 122 provides spot definition (i.e., a media type and category for each spot, or available time for advertising), and enables the publisher user to manually specify available inventory over different timeframes (i.e., inventory available per day, month, and the like). The planning engine also enables the publisher user to obtain the executable code (such as WAP or Java instructions) used to insert advertisements into available spots. The planning engine further facilitates the user put in place advertisement restrictions (i.e., competitive exclusion).

For the carrier user, the planning engine 122 provides the ability to define carrier rules (including global rules). Carrier rules may include, for example, frequency capping, advertisement restrictions (competitive exclusion, language), and campaign weighting and priority. The planning engine 122 further provides the carrier user with the ability to manually overwrite or set the campaign priority (i.e., define which advertisements within a campaign have higher priority and should be displayed first), and define pricing rules. The planning engine 122 additionally provides the carrier user the ability to validate advertisement content, and the ability to start and stop campaigns. For all three types of user, the planning engine 122 is further operable to generate reports with respect to each of the functionalities described above.

The planning engine 122 interfaces with the targeting engine 162 of the analytics engine 124 (which will be further described herein below) to specify the targeting criteria for the campaign and review the resulting subscriber-base matches the targeting criteria. The planning engine 122 may also use the targeting engine 162 to model campaigns for campaign planning. The planning engine 122 may also use the targeting engine 162 to obtain targeting criteria to which a user can strategically target advertisements. The planning engine 122 uses the inventory management & forecasting engine 164 to determine the capacity of inventory available for advertisement placement as a result of the targeted subscriber base determined by the targeting engine 162 and the spots being requested. The planning engine 122 interfaces with the pricing engine 120 to determine the pricing for the campaign being planned based on the targeting and inventory being used.

The analytic engine 124 is the "brain" of the advertisement fulfillment system 102. The analytic engine 124 contains the data and intelligence to enable planning and execution of campaigns that meet the requirements needed to target highly relevant advertisements to subscribers. The analytic engine 124 includes various components (as shown in FIG. 1B), including an optimization engine 160, a targeting engine 162, an inventory management and forecasting engine 164, a behavioral engine 166, a customer data integration ("CDI") 168, and a reporting engine 170, as described herein below.

Returning to FIG. 1A, the campaign execution unit 110 comprises various components, which may be implemented in hardware, software, or a combination of hardware and software. The campaign execution unit 110 is responsible for delivering advertisements to mobile devices 104. In the present illustrative framework, there are two types of advertisement delivery by the campaign execution unit 110: pull advertisements and pushed advertisements. In the case of pull advertisements, the user of the mobile device 104 accesses the internet or a particular application, and advertisements appear in the mobile device 104 as a result of this activity. In the case of push advertisements, initiating display of the advertisement requires no initiative or activity by the user (e.g., an unsolicited Short Message Service "SMS" message). Specifically, the campaign execution unit 110 comprises a delivery agent/advertisement server 126, a campaign execution engine 128, and an event handler 130. The campaign execution unit 110 is operably linked to the data stores 112 such that data in the various data stores 112 may be utilized by the delivery agent/advertisement server 126, the campaign execution engine 128, and the event handler 130.

The delivery agent/advertisement server 126 generally receives advertisement requests (in the case of pull ads) from a client or server-based application, requests an advertisement from the campaign execution engine 128, and responds with an advertisement to be served. In the case of push advertisements, the delivery agent/advertisement server 126 receives the advertisement content from the campaign execution engine 128 and sends the content to the mobile devices 104. The delivery agent/advertisement server 126 uses the specific protocols needed to receive advertisement requests and deliver advertisements. In various embodiments, the primary protocol used for receiving advertisement requests and delivering advertisements is HTTP.

The campaign execution engine 128 executes advertisement campaigns defined and activated with the campaign planner 108. The campaign execution engine 128 serves the advertisements for a given campaign upon receiving the advertisement requests (in the case of pull ads). Upon receiving an advertisement request from the delivery agent/advertisement server 126 (in the case of pull ads), the campaign execution engine 128 determines the appropriate advertisement to be served based on complex rules and parameters. In various embodiments, some criteria involved in determining the correct advertisement include:

- subscriber data (based on behavioral or demographic targeting),
- campaign weighting (i.e., bid pricing, actual impressions delivered vs. planned impressions),
- advertisement weighting and carrier delivery rules (e.g., frequency capping, advertisement placement restrictions),
- publisher requirements (i.e., different advertisements for different publishers and different spots),
- publisher content type (i.e., type of media being published such as WAP, Multimedia, and the like),
- time of day,
- location of the subscriber (in various embodiments, location is passed to the advertisement management system from the publisher, for example, subscriber zip code, or carrier, for example, GPS defined location), and
- contextual (e.g., the advertisement is selected as a result of what the user of the device is doing, such as performing a search with keywords. The context of keywords, defined as part of campaign, or a keyword passed to the advertisement management system from the publisher can be used to push related advertisements).

The campaign execution engine 128 receives some or all of the following information when an advertisement is requested: the subscriber id for the mobile device 104, the publisher (i.e., spot id), the content type, the location, and one or more keywords. The campaign execution engine 128 uses this information to determine the set of campaigns that are associated with the request, accomplished by looking for campaigns associated with the subscriber id and the spot id of the request.

Illustrative pseudo-code for determining the set of campaigns associated with an advertisement request is as follows:

If single campaign
  if Delivery rules state to deliver the ad
  Determine the correct advertisement & deliver the ad
  Else do not deliver the ad
Else multiple campaigns
  While campaigns
    Choose highest weighted campaign
      If Delivery rules state to deliver the ad
        Determine the correct advertisement & deliver the advertisement
      Else go to next weighted campaign In various embodiments, the campaign execution engine 128 utilizes a set of global delivery rules (which may or may not be hard coded) to make the decision on which campaign and advertisement to serve to the mobile device 104. The global rules may be defined by the carrier using the carrier user interface 118 of the Advertisement Fulfillment System 106. In various embodiments, decision making of the campaign execution engine 128 based on the global rules is accomplished in a timely manner (such as, for example, in less than 200 msec) to keep the overall latency of advertisement serving to the subscriber to a minimum.

The global delivery rules, in various embodiments, may be very complex. For example, if frequency capping for a subscriber is met and a particular campaign is lagging on its last day, the campaign execution engine may be enabled by the global rules to break the frequency capping rule and serve the advertisement in order to meet the goals of the campaign. In order for the campaign execution engine 128 to execute the global rules, the campaign execution engine 128 tracks information on previously served ads. The tracked information may include, for example, how many times an advertisement been served to a particular subscriber (e.g., for frequency capping), how many times has an advertisement been served for a given campaign (e.g., when an advertisement can be served for multiple campaigns and campaign weighting needs to be taken into consideration).

For push advertisements, the campaign execution engine also pushes advertisements for campaigns to the delivery manager. Finally, the campaign execution engine sends information regarding "advertisement events" to the event handler 130.

The event handler 130 receives advertisement events from the campaign execution engine, user actions or other sources, and records those events into an events database. The event handler 130 processes events as needed. For either push or pull advertisements, the campaign execution engine sends the "impression" delivery event to the event handler 130. For user actions, referred to in the industry as "click" events (click-to-url, click-to-call, click-for-SMS), the event handler 130 records the event and may call another component for subsequent action such as, for example, sending an SMS, or directing to another WAP site. Other sources of events include the Mobile Wallet and applications running on the mobile device 104 (such as, for example, a multimedia player and downloaded Java 2 Micro Edition "J2ME" applications). Each event handled by the event handler 130 may be used in billing and analytics (which are described in greater detail herein).

The data store or stores 112 comprise various databases, including an ad content or advertisement content or creative store 134, billing events or a billing events store 136, subscriber inventory or a subscriber inventory store 138, carrier delivery rules or a carrier delivery rules store 140, and campaign data or a campaign data store 142. The advertisement content store 134 may store the entire stock of advertisements that may be managed by the advertisement fulfillment system 102. In various embodiments, the advertisement content store 134 may store ads and the transfer them over to storage in the advertisements store 202 on a mobile device 104. The billing events store 136 stores invoicing data that may be used in billing advertising agencies, and stores settlement records that may be used in settling up with publishers for campaigns run on the system. The subscriber inventory store 138 stores subscriber data pertaining to each user that subscribes to the carrier, including subscriber identifiers and demographic data. The data in the subscriber inventory store 138 may be continuously or periodically updated. The carrier delivery rules store 140 stores rules relating to campaigns or particular advertisements or types of advertisements pertaining to how and when advertisements may be displayed. For example, a carrier rule may impose restrictions on frequency of advertisement display, advertisement restrictions such as competitive exclusion or language, and campaign weighting and priority. The campaign data store 142 stores data relating to campaigns, including, for example, targeting information, progress in a campaign, impression counts for specific advertisements, duration of the campaign, and the like. The data stores 112 are populated by various data sources 144. The data sources 144 include a subscriber mobile wallet 146 that contains personal identifying and financial data for the user of the mobile device, internal consumer info 148 maintained by the carrier, external consumer info 150 maintained by third parties, and a billing system 152 used for managing billing for advertising (as opposed to the billing system for the telecommunication services provided by the mobile device).

The present disclosure expands upon the different media types included as inventory for advertising in mobile devices. For instance, WAP pages are an inventory similar to internet web pages, but specifically created and formatted for mobile devices such as PDAs and mobile phones, designed to give users a richer data application experience that would enable "access to the Internet" through mobile devices. WAP pages may be the source of advertising inventory in the sense that ad banners or ad text may be added to web pages. Such ad banners or texts may, in various embodiments, be interactive (e.g., click-to-call, click-to-coupon, click-to-url, etc.).

Short Message System ("SMS") is a service available on most digital mobile phones that permits the sending of short messages (also known as text messages, messages, or more colloquially SMSes, texts or even txts) between mobile phones, and other handheld devices. SMS messages may be the source of advertising inventory (i.e., push technology instead of pull technology such as WAP pages, since messages can be pushed to a mobile device without subscriber initiation). SMS messages may be used to selectively push advertisements, or alternatively, they could be used as a result of a subscriber interaction with an advertisement elsewhere (such as, for example, when the user clicks on a banner advertisement to register for a contest, an SMS message could be pushed to send an entry notification to the user).

Multimedia content may be still another source of advertising inventory. Multimedia content includes content that is played on a media player on the handset, similar to playing audio/video using Microsoft Media Player or Apple's QuickTime Pro on a computer. Multimedia content may be either "on demand" or "live content." In on demand content, a video clip of a predetermined length is played. In the case of on demand content, an advertisement may be played before the requested clip (pre-roll), during the requested clip, or after the requested clip (post-roll). In the case of live content, the content is streamed and plays as long as the user permits the media player to play it. Similar to regular television, advertisements may be inserted into the stream. In various embodiments, there are both national and local ad spots.

Searches, as a subset of WAP pages, comprise still another source of advertising inventory in the sense that a user may enter keywords in a search, and the keywords may be utilized in targeting advertisements. For instance, if a user entered into a search the keywords "bed frames," advertisements for local mattress stores may be triggered based on context. Search engines enable contextual targeting with the user of the mobile device providing in the search string things of interest to her.

A directory application may provide additional advertising inventory in the sense that a directory is a subset of java applications, and advertisements may be served up in any type of java application. In a type of directory application (i.e., java application) that gives directions, advertisements relevant to locations along the direction route may be placed in the application along with the directions. Similarly advertisements may be displayed in a web page application providing directory assistance.

Location based applications may be additional advertising inventory in the sense that in Java applications, a particular advertisements may be served up in response to a determination of the location of the mobile device.

Start-up/shut-down of J2ME applications may be advertising inventory in the sense that they offer additional locations within a java application where advertisements may be placed. In addition to placing advertisements at the startup and shutdown of a java application, advertisements may be embedded within an application itself as it runs on the mobile device. For example, in an application for a race car game, an advertisement may be displayed in a road sign graphic in the game or at the bottom of a game where white space is available next to the score, the timer, etc.

III. Analytic Engine and Relationships

Referring to FIGS. 1A, 1B, 2 and 3, components of the analytics engine 124 are depicted along with relationships to other modules. In addition to the components of the analytics engine 124, rating/pricing data 304, a publisher inventory 306, and segmented data 308 are depicted that are a part or a sub-part of the data store 112 or a data source 144. In the depicted embodiment, these parts are included in the data store 112.

The optimization engine 160 of the analytic engine 124 optimizes in-progress campaigns. The optimization engine 160 receives feedback on in-progress campaigns via the event handler 130, and modifies or optimizes the in-progress campaigns based on campaign optimization rules 410. In various embodiments, examples of campaign optimization rules 410 include promoting particular spots or particular advertisements that are performing better than others, or prioritizing a particular campaign lagging behind in the number of impressions.

The optimization engine 160 supports two modes of adjustment: an automated campaign adjustment that requires no human intervention, and a manual adjustment, where the optimization engine 160 provides recommendations but the recommendations are not implemented until a user triggers the change to the in-progress campaign.

For an automated or manually implemented adjustment, the optimization engine 160 interfaces with the planning engine 122, which can obtain data from the campaign database 142, to create a modified campaign. The optimization engine 160 leverages the logic used to create and/or modify a campaign. The planning engine 122 then automatically pushes the modified campaign to the campaign execution engine 128, or for a manual adjustment, presents the modified campaign to a user. The user reviews the modified campaign, and decides which, if any, of the modified recommendations to provide to the campaign execution engine 128. Pricing information can be communicated by the pricing engine 120, which in turn can obtain data from rating/pricing data 304.

Generally, the targeting engine 162 of the analytic engine 124 provides one-to-one targeting functionality (i.e., at the subscriber level) for campaigns. Two types of targeting are supported: demographic targeting and behavioral targeting. The targeting engine 162 processes the data provided by other components (e.g., the CDI module 168 and the behavioral engine 166 which will be discussed in detail below) to result in data that may be stored in the various data stores.

The targeting engine 162 can obtain data from the subscriber inventory 138 and exchange information with the segmented data 308.

Upon receiving certain targeting criteria, the targeting engine 162 returns a subscriber base that meets the specified targeting criteria. Additionally, the targeting engine conducts campaign scenario modeling, which involves running campaign tests and "what if" scenarios for the purpose of campaign planning, with the goal of planning an optimally successful campaign. In various embodiments, the targeting engine 162 may assist in determining targeting criteria to maximize the effectiveness of the campaign.

The targeting engine 162 operates on data that is known for a given subscriber, and thus some forms of location targeting may not be supported by the targeting engine 162 (e.g., non-fixed, GPS location is not known ahead of time). The planning engine 122 is, however, operable for targeting by location, which is a runtime decision implemented by the campaign execution engine 128 as to whether a particular subscriber meets specific location targeting criteria.

The inventory management and forecasting engine 164 of the analytic engine 124 performs inventory management functions across all different types of delivery vehicles (i.e., WAP, Multimedia etc). The inventory management and forecasting engine 164 accomplishes inventory management by dynamically determining the capacity for a given publishing spot based on previous customer usage and business rules (i.e., it might boost availability 20% for Superbowl week for a given spot). The inventory management and forecasting engine 164 may receive the events information from the event handler 130 and exchange data with the publisher inventory 306. Initially, prior to having historical customer usage data, the available inventory across all spots is manually set. Previous customer usage being tracked in the carrier data archiving systems may be used by the inventory management and forecasting engine 164 to predict the initial available inventory.

In various embodiments, such data includes a table in the Call Detail Records ("CDR") archive, which stores user click through information from Network Gateway ("NGG") 212 between the device 104 and the AFS 102. The CDR archive is a carrier data store that keeps track of subscriber web usage (including visits to URL sites) and transaction detail records ("TDRs"). TDRs are subscriber records of Premium Content Purchase. CDRs and TDRs can be used to conduct behavioral analysis of users of mobile devices in order to target advertisements based on behavior. The NGG 212 is the gateway through which all HTTP requests from the handset travel. The NGG 212 is the mechanism that inserts the unique client id in the HTTP header requests. The unique client id is subsequently passed on to the publisher, and may then be passed on to the ad fulfillment system 102 when a request is made for an advertisement. The unique client id inserted into the HTTP requests by the NGG 212 allows the ad fulfillment system 102 to uniquely identify each user of a mobile device to whom an ad will be served, which may then be used in targeting advertisements to specific users of mobile devices.

Based on the subscriber-base targeted for a given campaign, other campaign parameters (time/date), and global rules (frequency capping), the inventory management and forecasting engine 164 determines the relevant inventory for a given spot. Because the subscriber-base targeted for a given campaign is known (as discussed with respect to the targeting engine 162 herein), the inventory management and forecasting engine 164 determines the impact to available inventory as a result of the targeting criteria.

The behavioral engine 166 of the analytic engine 124 associates categories with subscribers based on the subscribers' behaviors. Such categories may include sports, news, entertainment, or other potential subscriber interests. The behavioral engine 166 utilizes events recorded by the event handler 130 in, e.g., campaign data store 142, and various behavior rules defined by the carrier, to determine the appropriate category assignments for each subscriber. The categorical data assigned by the behavioral engine 166 augments the demographic data stored by the CDI module 168. Demographic data may be linked to behavioral data because targeting for a specific campaign may leverage both demographic data and behavioral data for an existing customer base.

The CDI module 168 of the analytic engine 124 imports data from various internal customer info 148 (i.e., carrier sources) with multiple file formats, and augments that data with customer data from external consumer info 150 such as publishers, advertisers or $3^{rd}$ party data (i.e., InfoUSA) into a single customer data store. The primary type of data in this single data store generated by the CDI 168 is demographic data (age, gender, marital status, and the like). In order to integrate the internal and external data, the CDI 168 matches data by relating and/or associating data. In various embodiments, this is performed by identifying a primary key. Additionally, the CDI 168 transforms data into a common file format, and merges the data. Finally the CDI 168 cleans up merged the data by removing duplicates (i.e., "de-duplicating"). The CDI 168 additionally imports multiple incoming file formats (i.e., comma delimited, XML, and the like) through the use of a tool without requiring coding.

The reporting engine 170 of the analytic engine 124 performs what is commonly referred to in the industry as Web Analytics, or data mining. The reporting engine 170 produces the following reports: status and/or results of in-progress campaigns (i.e., near real-time statistics), status and/or results of past campaigns, statistics on forecast versus actual campaign data, statistics on targeting results, statistics on performance according to publisher, and statistics on performance according to advertisement. Additionally, the reporting engine 170 enables the user to create custom reports on any data that is stored in the data stores 112.

IV. In-Flight Optimization System

Figure 2:
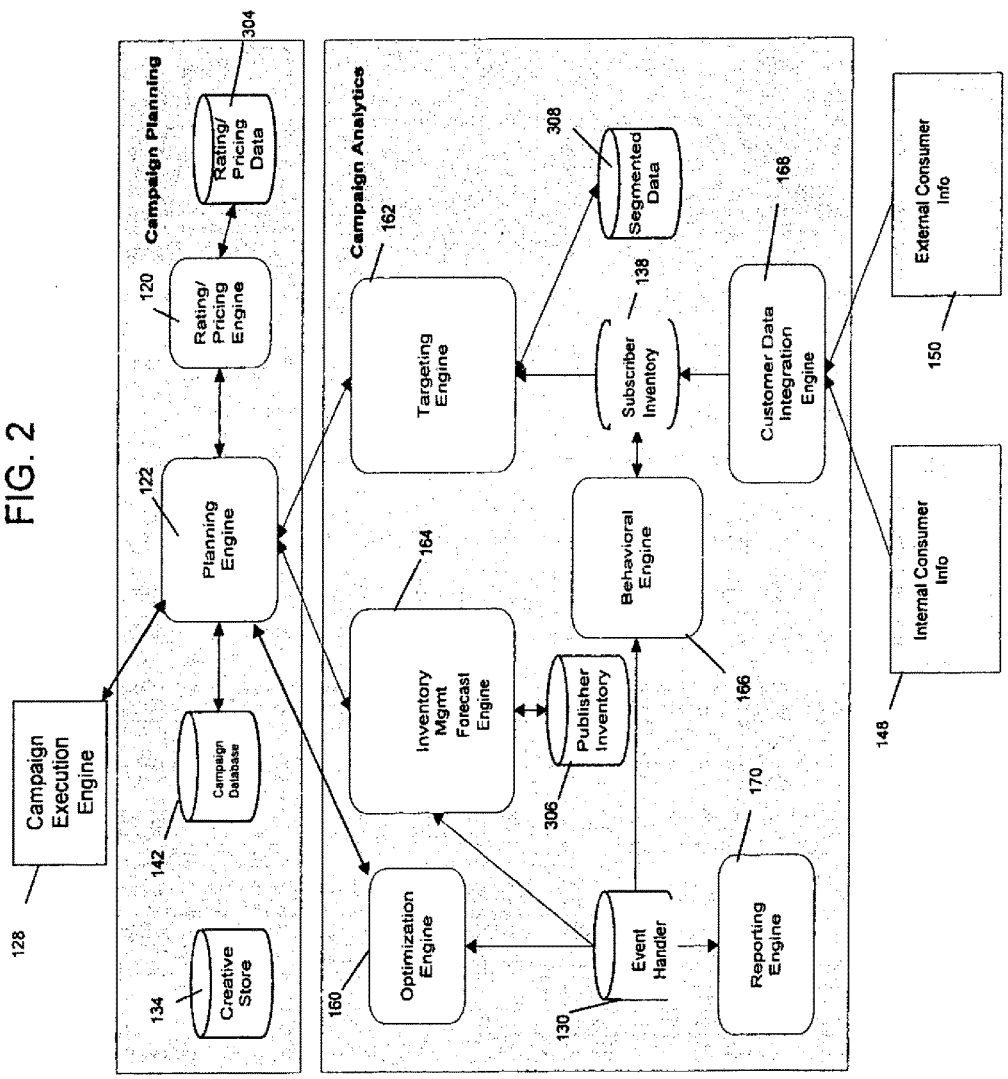
FIG. 2 is a block diagram of relationships of illustrative analytic and planning engines.
Figure 3:
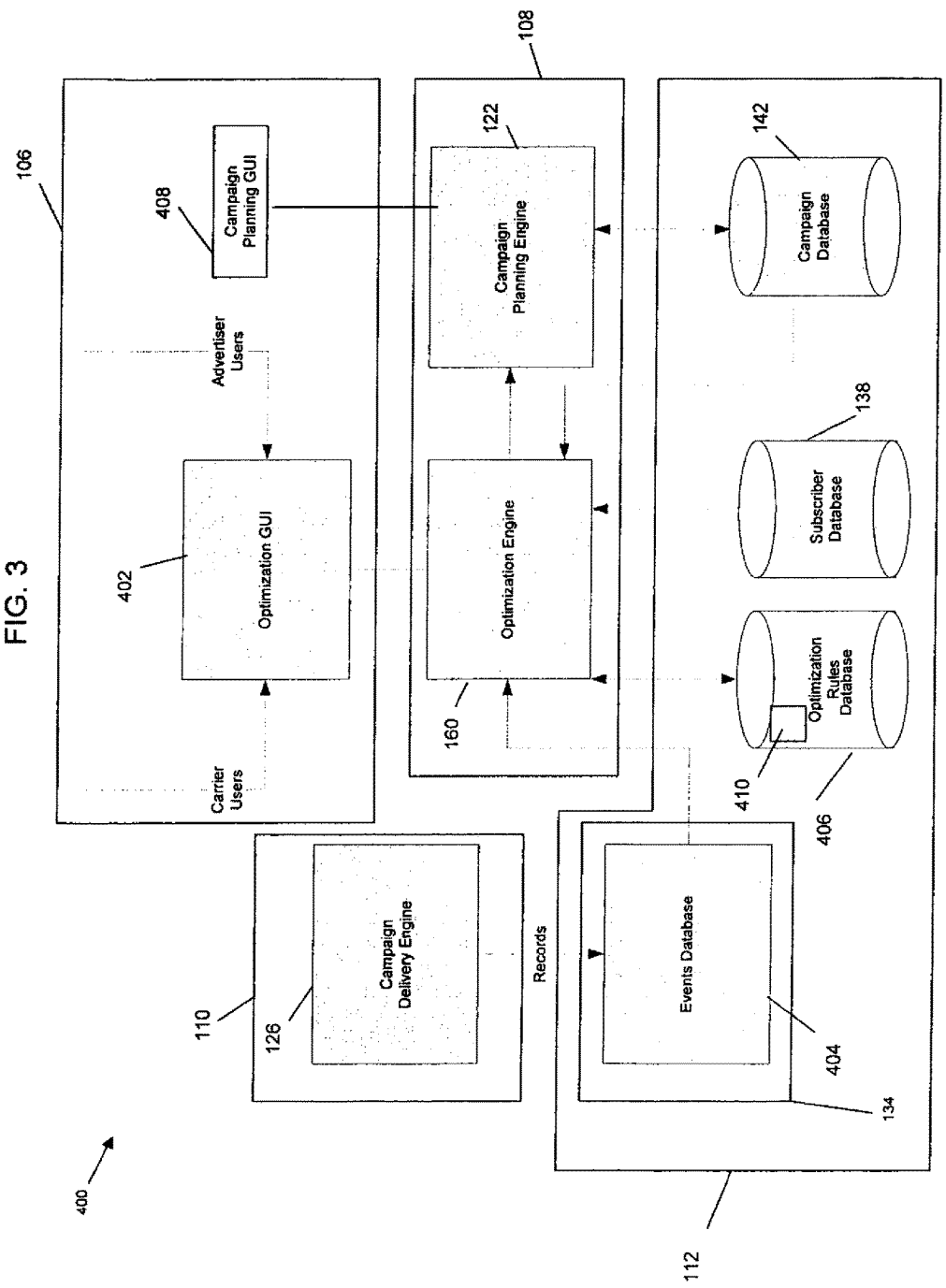
FIG. 3 is a block diagram of one illustrative system for optimizing a campaign.

Referring to FIGS. 2 and 3, an in-flight optimization system 400 can include the advertisement management user interface 106, a campaign planner 108, a campaign execution unit 110 and a data store 112. The advertisement management user interface 106 may include an optimization graphic user interface (hereinafter may be referred to as "GUI") 402. Generally, the campaign planner 108 includes the optimization engine 160 and the campaign planning engine 122. The campaign execution unit 110 can include the delivery agent/advertisement server or campaign delivery engine 126. Generally, the data store 112 includes an events database 404, an optimization rules database 406 containing the optimization rules 410, a subscriber database 138, and a campaign database 142.

The optimization GUI 402 can be used by both carriers and advertisers to interact with the optimization engine 160. Carriers can use the GUI 402 to view optimization alerts and reports. Also, generally carriers utilizing the GUI 402 specify optimization rules 410 which will be applicable across all campaigns and are generally applied automatically. Some examples of carrier campaign optimization rules 410 are:

If a campaign is lagging by x %, increase the campaign weight by y %;

If a campaign is doing better by n %, decrease the campaign weight by m %;

Campaigns involving low number of customers, i.e. campaigns with strict targeting, have increased weight;

High paying campaigns have higher weights; and

Higher weighting for preferred advertiser campaigns.

Advertisers generally use the GUI 402 to specify the rules for optimizing their in-flight campaigns. They may elect to apply some of the optimizations automatically. For other optimizations, they may elect to see recommendations and then later choose to accept or reject optimization recommendations (based upon cost & schedule implications). The GUI 402 may be used to see recommendations and auto optimization alerts as well. Some examples of advertiser optimization rules 410 are:

After tracking gender, if one advertisement seems to be more attractive to men and the other to women, weight them accordingly when targeting each group (i.e. dynamically modify the previous targeting criteria). In order words, an advertisement that is proving to be more successful with men may be weighted above the advertisement proving to be more successful for women for purposes of targeting men, and vice versa. The advertiser may specify to apply this change automatically.

After tracking the age group for each subscriber selecting or otherwise responding to an advertisement, create a segment for each age group, e.g. 25-35 year olds, and subsequently play the advertisement having the greatest number of selections in a given age group to future segments. As an example, if a first advertisement out of three has the greatest number of selections to 25-35 year olds after tracking, the campaign can be adjusted to only present the first advertisement to 25-35 years for remainder of the campaign or until a subsequent modification. The advertiser may ask for a recommendation before applying this change.

Similarly, the most desired advertisement during a particular time in a day can be tracked. The campaign can be modified during its run to play only the most selected advertisement based on the historical tracked data for a particular time for the remainder of the campaign or until a subsequent modification.

Also, combinations of advertisements can be played together. The performance of advertisements in particular combinations can be tracked, particularly which combination results in the greatest number or longest viewing of a particular ad. The campaign can be modified to play an advertisement in a combination with one or more other advertisements that resulted in the greatest number of selections or the longest viewing time based on historical tracked data for the remainder of the campaign or until a subsequent modification is made.

The optimization engine 160 has been described above for the advertisement fulfillment system 102. In the in-flight optimization system 400, the optimization engine 160 can support the GUI 402, maintain the optimization rules database 406 and optimize the campaigns as per the rules. The optimization engine may use events database 402 and the subscriber database 138 to analyze the events on the campaign, as per the applicable rules for the campaign. The optimization engine 160 can also interact with the planning engine 122 to make optimization changes in the campaigns and to also get the cost schedule implications of optimizations on a campaign. The campaign planning engine 122, in turn, may interact with the targeting engine 162, the inventory management forecast engine 164 and the pricing engine 120. Generally, the optimization engine 160 makes automatic changes in campaign weighting and priorities as per the rules, issues alerts to carriers/advertisers through the GUI 402, and provides the recommended rules through the GUI 402. Once the recommended rules are accepted, the optimization engine 160 can change the campaign and provide alerts.

Regarding the databases, the optimization rules database 406 may store all the campaign optimization rules 410 as specified by the carriers and/or advertisers, the events database 404 can hold all the events, e.g., impressions, click through, etc., on all campaigns. Generally, the campaign delivery engine 126 records an event into this database 402 each time the engine 126 serves an impression or a subscriber interacts with an ad. These records can have an associated subscriber identifier, thus the event data can be joined with the subscriber data for performing analyses. The campaign database 142 can hold data pertaining to all the campaigns and associated parameters. Generally, the campaign planning engine 122 maintains this database 142 and this is used/referenced by multiple other components including the campaign execution engine 110. Also, generally the subscriber database 138 holds all the subscriber records. The optimization engine 160 may use this information to perform optimization analysis on in-flight campaigns as per the optimization rules 410. This is an improvement over campaigns previously carried out without knowledge of which subscriber was shown an advertisement or what additional advertisements are targeted to the specific subscriber.

The campaign execution engine 110 and campaign planning engine 122 are described above for the advertisement fulfillment system 102. In the in-flight optimization system 400, the campaign delivery engine 126 may deliver ads into various content provider spots upon request by a content provider. All these events may be recorded in the events database 404.

Generally, the campaign planning engine 122 interacts with multiple other components like the targeting engine 162, inventory management forecast engine 164, pricing engine 120 and optionally supports a campaign planning GUI 408. This engine 122 can maintain the campaign database 142. The optimization engine 160 may work with this engine 122 to make optimizations to the in-flight campaigns based upon specified rules and also to get the cost/schedule implications for optimizations. The campaign planning engine 122 may interact with other components mentioned above to ascertain the cost/schedule implications of campaign optimizations. It can provide such reports to carriers and advertisers through the campaign planning GUI 408. Moreover, in some instances the campaign planning GUI 408 permits the picking and choosing of rules to be applied during the campaign. In such an instance, the campaign planning GUI 408 may have one or more functions or all of the functionality of the optimization GUI 402 described above, and can be used supplement or replace the optimization GUI 402.

V. An Illustrative In-Flight Campaign Optimization Mode

Figure 4:
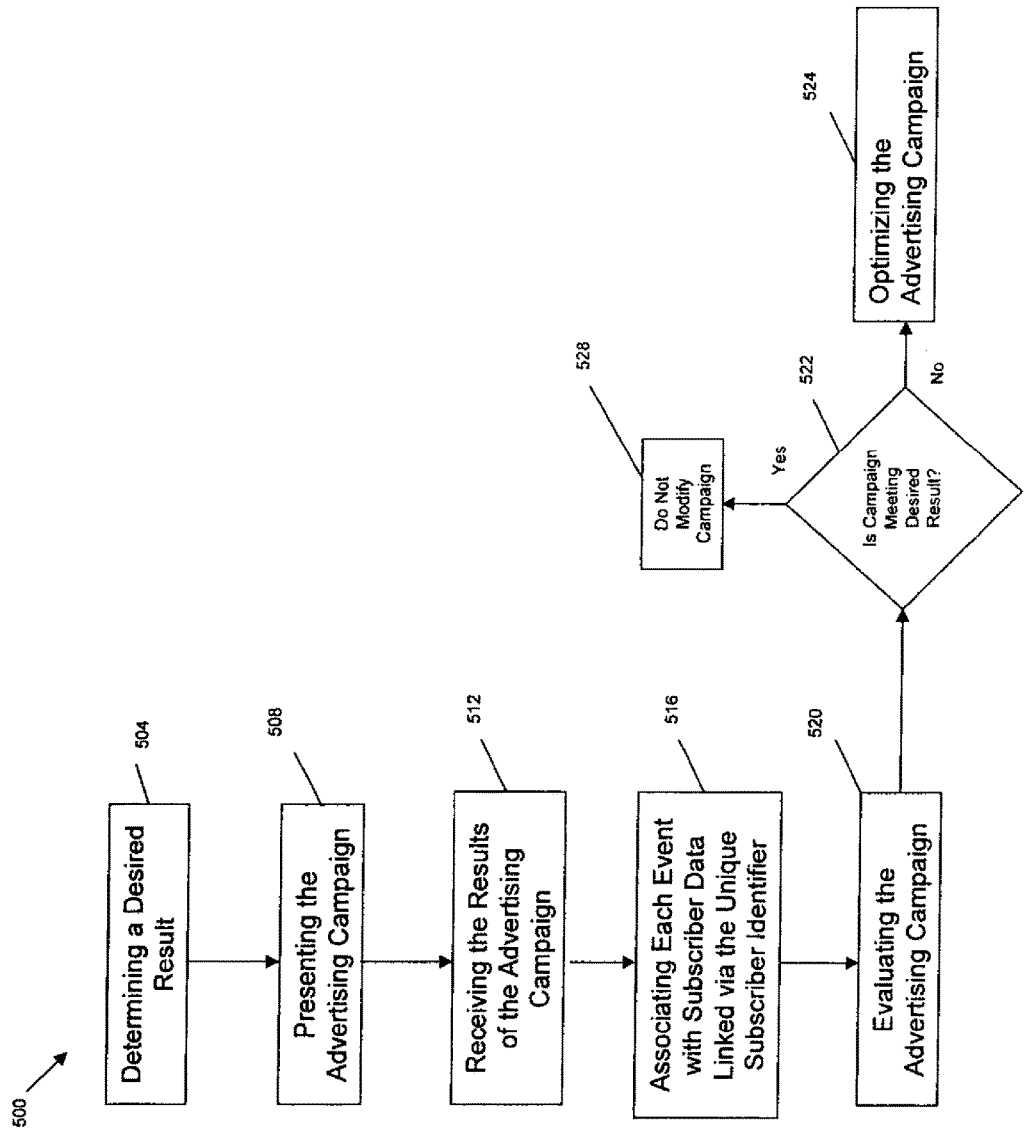
FIG. 4 is a block diagram of an illustrative mode of operation for an in-flight campaign optimization.

In one illustrative mode of operation 500 of an advertising campaign (shown in FIG. 4), the method can include determining a desired result at a block 504, presenting the advertising campaign on the mobile device to subscribers at a block 508, receiving the results of the advertising campaign at a block 512, associating each campaign event with subscriber data linked via the unique subscriber identifier at a block 516, evaluating the advertising campaign based on actual segments of subscribers receiving campaign events versus the desired segment at a block 520. A query can be made at a diamond 522, namely is the campaign meeting the desired result? If not, optimizing the advertising campaign during its run based on the results of the comparison is undertaken at a block 524. If so, the campaign may not be modified at a block 528.

Determining a desired result at the block 504 can include an advertiser consulting with their client to determine the number and type of consumers to be exposed to the advertising campaign. As an example, a client may wish to target 200,000 males aged 30-45 years old. Thus, the advertiser can communicate this desired result of 200,000 males aged 30-45 years old to the carrier to evaluate the timing and number of advertisements to accomplish this result. Alternatively, the desired result may be reaching 200,000 individuals, maybe at a particular time and location.

To accomplish the desired result, an advertiser or carrier can use the optimization GUI 402 to select the desired optimization rules 410 from the optimization rules database 406 to modify the campaign, if necessary, to accomplish the desired result. In addition, the carrier can run models based on past data to ascertain the number and type of audience members when varying parameters such as the timing and type of advertisements in the campaign. As an example, data pertaining to subscriber viewing habits can be saved to determine the demographic watching a given website, e.g. a sports website, at a given time. After selecting the desired rules, the carrier and advertiser can provide an advertising campaign to make one or more advertisements available, optionally with one or more publishers, to subscribers.

Presenting the advertising campaign at the block 508 can include associating each advertising event with a unique subscriber identifier. This association can occur when a subscriber views a campaign event with a mobile device. Afterwards, the data pertaining to the viewed advertisement and associated subscriber identifier can be transmitted to the campaign delivery engine 126 for saving in the events database 404.

Receiving the results at the block 512 in the optimization engine 160 permits analysis of the event data. Particularly, the subscriber identifier associated with an advertising event allows the retrieval of subscriber demographic data from the subscriber database 138. Associating subscriber data at the block 516, e.g., demographic data, with each advertising event allows analysis of the advertising campaign on various segments of the campaign audience. In this example, the number of males 30-45 years old viewing the advertising campaign can be ascertained.

Associating the subscriber data with the event data allows comparing the results at the block 520. Particularly, the actual segment viewing the advertisements can be compared to the desired result. Also, the overall reach of the advertising campaign can be evaluated. If the advertising campaign is not meeting the desired number and/or type of individuals viewing the advertising campaign, optimizing the campaign at the block 524 can be undertaken. As discussed above, optimizing can include adjusting the campaign weight, e.g., increasing the campaign weight for a lagging advertising campaign or decreasing the campaign weight for an advertising campaign exceeding expectations. In addition, optimizing can include permitting a carrier and/or advertiser to modify or waive one or more rules 410 in the optimization rules database 406 using the optimization GUI 402 or campaign planning GUI 408 during the advertising campaign. Thus, the operating parameters of the campaign execution engine 128 can be changed one or more times during the campaign. Also, the optimization engine 160 can communicate with the pricing engine 120 via the planning engine 122 to adjust advertising rates. As an example, if the advertising campaign exceeds the desired number of viewers in a segment, rates could be increased, and conversely, decreased if there is a shortfall of viewers for a particular forecasted segment.

Although only one evaluation and optimization is exemplified, it should be understood that multiple evaluations and optimizations may occur during the course of an advertising campaign. The automated system permits the constant feedback and evaluation of an advertising campaign.

Figure 5:
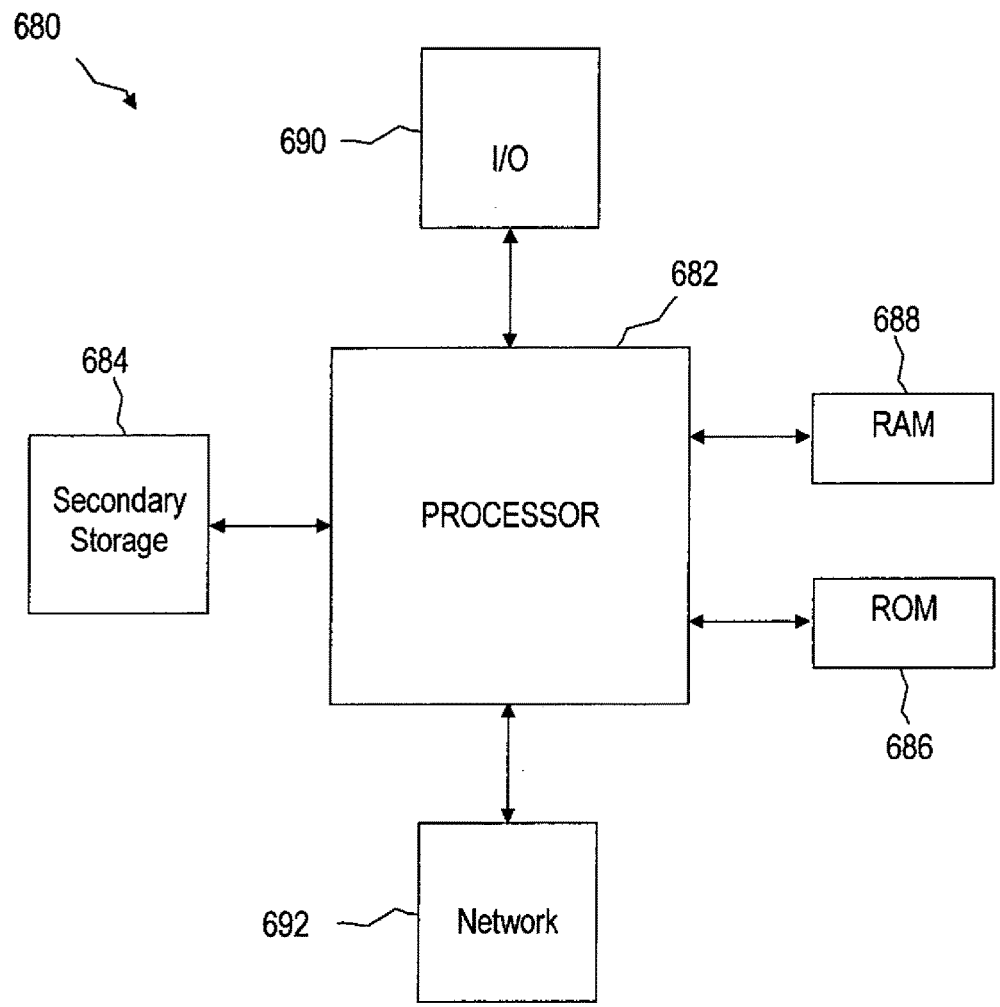
FIG. 5 shows an illustrative general purpose computer system suitable for implementing, at least in part, the several embodiments of the disclosure.

The dynamic content distribution and placement framework of the present disclosure may be implemented, at least partially, on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 680 includes a processor 682 (which may be referred to as a central processor unit or CPU) that is in communication with memory devices including a secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if the RAM 688 is not large enough to hold all working data. The secondary storage 684 may be used to store programs which are loaded into the RAM 688 when such programs are selected for execution. The ROM 686 is used to store instructions and perhaps data which are reads during program execution. The ROM 686 is a non-volatile memory device which typically has a small memory capacity relative to the larger memory capacity of secondary storage. The RAM 688 is used to store volatile data and perhaps to store instructions. Access to both the ROM 686 and the RAM 688 is typically faster than to the secondary storage 684.

The I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (COMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using the processor 682, may be received from and outputted to the network, for example, in the form of a computer data signal embodied in a carrier wave.

Such information, which may include data or instructions to be executed using the processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered the secondary storage 684), the ROM 686, the RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of optimizing an advertising campaign presented on at least one mobile device, comprising:
   providing, by a server, one or more advertisements of the advertising campaign on mobile devices of subscribers;
   tracking campaign events of the advertising campaign with the server, wherein each of the campaign events comprises a single presentation of the one or more advertisements of the advertising campaign to one of the mobile devices, wherein each of the campaign events is associated with a unique subscriber identifier of a subscriber corresponding to the one of the mobile devices, and wherein one of the campaign events is recorded into a data store of the server each time one of the advertisements of the advertising campaign is delivered to a mobile device of the mobile devices of the subscribers;
   receiving, by the server, unique subscriber identifiers associated with the campaign events after the one or more advertisements of the advertising campaign are presented to the mobile devices of the subscribers;
   in response to receiving the unique subscriber identifiers, obtaining subscriber demographic data associated with the campaign events from a subscriber database using the received unique subscriber identifiers associated with the campaign events;
   determining actual segments of subscribers that were presented with the one or more advertisements of the advertising campaign using the obtained subscriber demographic data;
   evaluating the advertising campaign using an optimization engine based on a comparison of the actual segments of subscribers receiving one or more campaign events versus a desired segment; and
   optimizing the in-progress advertising campaign during its run based on the comparison of the actual segments of subscribers versus the desired segment by dynamically modifying targeting criteria when the in-progress advertising campaign is performing better among one segment than another segment.

2. A method according to claim 1, wherein the presenting comprises selecting targeted advertisements in accordance with campaign optimization rules, and wherein the optimizing includes altering the rules.

3. A method according to claim 1, further comprising providing one or more optimization rules for adjusting the in-progress advertising campaign based on the comparison of the actual segments of subscribers versus the desired segment.

4. A method according to claim 3, further comprising providing an optimization rule database for storing optimization rules.

5. A method according to claim 4, further comprising providing a graphic user interface for a carrier or an advertiser for selecting one or more optimization rules for optimizing the in-progress advertising campaign.

6. A method according to claim 1, further comprising raising or lowering advertising rates based on the comparison of the actual segments of subscribers versus the desired segment.

7. A method according to claim 1, further comprising adjusting a campaign weight based on the comparison of the actual segments of subscribers versus the desired segment.

8. A method according to claim 1, further comprising evaluating a reach of the campaign to the desired segment of the in-progress advertising campaign.

9. A method according to claim 8, further comprising optimizing the in-progress advertising campaign to reach the maximum number of subscribers in the desired segment of the in-progress advertising campaign.

10. A method according to claim 1, wherein the mobile devices comprise at least one telephone.

11. A method according to claim 1, wherein optimizing comprises at least one of automatically adjusting the in-progress advertising campaign without human intervention, and manually adjusting the in-progress advertising campaign by providing recommendations that are not implemented until a user triggers the change to the in-progress advertising campaign.

12. A method according to claim 1, wherein optimizing comprises promoting a particular spot or particular advertisement having a better performance than any other spot or advertisement respectively.

13. A method according to claim 1, wherein optimizing comprises at least one of prioritizing a particular campaign lagging behind in a number of impressions and extending the particular campaign lagging behind in the number of impressions.

14. A method according to claim 1, wherein optimizing comprises at least one of increasing the campaign weight by a first percentage if a campaign is lagging by second percentage, and decreasing the campaign weight by a third percentage if the campaign is leading by a fourth percentage.

15. A system for optimizing an advertising campaign, comprising:
- a graphic user interface for accessing by at least one of a carrier and an advertiser;
- a data store;
- a campaign delivery engine that:
  - delivers advertisements into content provider spots for presentation on mobile devices,
  - records campaign events of the advertising campaign into the data store, wherein each of the campaign events comprises a single presentation of one or more of the advertisements delivered to one of the mobile devices, wherein each of the campaign events is associated with a unique subscriber identifier of a subscriber corresponding to the one of the mobile devices, and wherein one of the campaign events is recorded into the data store each time an advertisement of the advertising campaign is delivered to a mobile device of the mobile devices, and
  - receives unique subscriber identifiers associated with the campaign events after the one or more of the advertisements are presented to the mobile devices; and
- an optimization engine that:
  - supports the graphic user interface,
  - analyzes the campaign events for adjusting the in-progress advertising campaign during its run by obtaining corresponding subscriber demographic data from the data store based on the received unique subscriber identifiers associated with the advertising campaign and determining actual segments of subscribers that were presented with the one or more of the advertisements using the obtained subscriber demographic data, and
  - adjusts the in-progress advertising campaign during its run by modifying a campaign weight for the in-progress advertising campaign with respect to other advertising campaigns based on a comparison of the actual segments of subscribers verses desired segments of the subscribers, wherein the campaign weight specifies an amount of playtime of advertisements of the in-progress advertising campaign with respect to advertisements of other advertising campaigns.

16. A system according to claim 15, further comprising a campaign planning engine communicating with the optimization engine to provide at least advertising pricing information.

17. A system according to claim 15, wherein the data store comprises an optimization rules database, a subscriber database, an events database, and a campaign database.

18. A system according to claim 15, wherein the optimization engine is operable to automatically adjust the in-progress advertising campaign without human intervention.

19. A system according to claim 15, wherein the optimization engine is operable to manually adjust the in-progress advertising campaign by providing recommendations that are not implemented until a user triggers the change to the in-progress advertising campaign.

20. A system according to claim 15, wherein the optimization engine is operable to optimize a campaign during its run by at least one of promoting a particular spot or particular advertisement having a better performance than any other spot or advertisement respectively, prioritizing a particular campaign lagging behind in a number of impressions and extending the particular campaign lagging behind in the number of impressions, increasing the campaign weight by a first percentage if a campaign is lagging by second percentage, and decreasing the campaign weight by a third percentage if the campaign is leading by a fourth percentage.

* * * * *